United States Patent [19]
Koppen

[11] Patent Number: 6,031,039
[45] Date of Patent: Feb. 29, 2000

[54] ANTI-STATIC COMPOSITION

[75] Inventor: Johannes Evert Aloisius Koppen, Alblasserdam, Netherlands

[73] Assignee: E. I. du Pont de Nemours and Company, Wilmington, Del.

[21] Appl. No.: 08/933,195

[22] Filed: Sep. 16, 1997

Related U.S. Application Data

[60] Provisional application No. 60/026,579, Sep. 18, 1996, and provisional application No. 60/052,858, Jul. 17, 1997.

[51] Int. Cl.$^7$ ............................. C08J 5/10; C08K 3/04; C08L 71/02
[52] U.S. Cl. ..................... 524/495; 524/496; 524/546; 524/507
[58] Field of Search .................... 524/495, 496, 524/546, 507

[56] References Cited

U.S. PATENT DOCUMENTS

| | | | |
|---|---|---|---|
| 4,009,043 | 2/1977 | Preis | 106/204 |
| 4,804,716 | 2/1989 | Flexman, Jr. | 525/399 |
| 4,934,577 | 6/1990 | Sugimoto et al. | 226/196 |
| 4,945,126 | 7/1990 | Crosby et al. | 524/507 |
| 5,135,773 | 8/1992 | Suzuki | 427/13 |
| 5,194,328 | 3/1993 | Suzuki et al. | 428/328 |
| 5,206,073 | 4/1993 | Suzuki | 428/195 |
| 5,207,949 | 5/1993 | Niino et al. | 252/511 |
| 5,286,807 | 2/1994 | Flexman, Jr. | 525/399 |
| 5,371,156 | 12/1994 | Komatsu et al. | 525/491 |

FOREIGN PATENT DOCUMENTS

| | | |
|---|---|---|
| 233729 | 4/1987 | European Pat. Off. . |
| 0453218 A1 | 10/1991 | European Pat. Off. . |
| 0623935A1 | 9/1994 | European Pat. Off. . |
| 46-43999 | 1/1900 | Japan . |
| 60-028063 | 2/1985 | Japan . |
| 60-054348B | 11/1985 | Japan . |
| 61-034033A | 2/1986 | Japan . |
| 62-0903113A | 4/1987 | Japan . |
| 63-278968 | 11/1988 | Japan . |
| 02235730A | 9/1990 | Japan . |
| 03001907A | 1/1991 | Japan . |
| 3-026726 | 2/1991 | Japan . |
| 3-080819B | 12/1991 | Japan . |
| 92064555B | 10/1992 | Japan . |
| 93021937B | 3/1993 | Japan . |
| 6-043543B2 | 6/1994 | Japan . |
| 6-172612 | 6/1994 | Japan . |
| 7-022960B2 | 3/1995 | Japan . |
| 1685961 | 6/1989 | U.S.S.R. . |

*Primary Examiner*—James J. Seidleck
*Assistant Examiner*—U. K. Rajguru
*Attorney, Agent, or Firm*—Hilmar L. Fricke

[57] ABSTRACT

An anti-static composition comprising (a) 65–99% by weight of a polyoxymethylene polymer; (b) 1–10% by weight of carbon fiber and, optionally, (c) 0–20% by weight of additive compounds. The invention further relates to a process for preparing such a composition and to molded articles comprising such a composition.

15 Claims, No Drawings

ANTI-STATIC COMPOSITION

This application claims the benefit of U.S. Provisional Application Ser. No. 60/026,579 filed Sep. 18, 1996 and U.S. Provisional Application Ser. No. 60/052,858 filed Jul. 17, 1997.

BACKGROUND OF THE INVENTION

1. Field of the Invention

The invention relates to an anti-static composition, to a process for preparing such composition and to moulded articles comprising anti-static compositions, such as mechanical components.

2. Description of Prior Art

It is known to use electroconductive carbon black in anti-static resin compositions comprising polyoxymethylene (POM) and an epoxy resin compound. Such compositions preferably comprise also an additive for curing the epoxy resin.

It is furthermore known to use carbon fiber for manufacturing an electroconductive composition having a relatively high tensile strength by mixing a carbon fiber with a specific surface layer together with any one of a wide range of thermoplastic resins, including polyoxymethylene.

Significant disadvantages of such known compositions are their less than optimal processability and resulting electrical-, mechanical- and/or thermal properties. For example, the use of carbon black in polyoxymethylene-containing compositions results in less favorable thermal conductivity compared with virgin resin, in particular since relatively large amounts of carbon black have to be used to obtain the desired electroconductivity. Epoxy resins are not reacting in a favourable manner when extrusion of the compositions is envisaged, which is an efficient method of obtaining homogenous compositions comprising POM resins.

Moreover, although the addition of carbon fiber is known to increase the tensile strength of a resin composition, the processability of compositions containing substantial amounts (e.g. 15–20% by weight or more) of carbon fiber in order to make an inherent insulator such as POM resin electroconductive, is not very good, in particular when moulding applications are envisaged.

It would be of substantial interest to manufacturers of anti-static compositions and electrical- or mechanical components made therefrom, if resin compositions would be available which possess both excellent electrical- and mechanical properties and can be processed in equipment normally used therefor.

Surprisingly, it has now been found that anti-static compositions with such desired properties can be obtained by combining a relatively small fraction of carbon fiber with a polyoxymethylene polymer.

SUMMARY OF THE INVENTION

The present invention relates to an anti-static composition comprising:
(a) 65–99% by weight of a polyoxymethylene polymer;
(b) 0.5–10% by weight of carbon fiber and, optionally
(c) 0–20% by weight of additive compounds.

The invention further relates to a process for preparing an anti-static composition comprising the following steps:
(a) preparing a concentrate composition comprising
   (i) 55–88% by weight of a polyoxymethylene polymer
   (ii) 12–25% by weight of carbon fiber, and optionally,
   (iii) 0–20% by weight of additive compounds, and
(b) combining the concentrate composition obtained in step (a) with a polyoxymethylene polymer-containing compound.

DETAILED DESCRIPTION

The combination of conductive materials and inherently insulating resins in order to change the electrical properties of such resins has been known for a long time. Unfortunately, optimization of a specific (electrical) property usually results in degradation of other properties (mechanical, processing, etc.) of the resulting resin composition. In view of the large member of variables in chemical composition manufacture and behaviour of resin compositions, even when the major resin component is selected to be POM, it is not feasible for a person skilled in the art to optimize an anti-static resin composition using all those variables.

Surprisingly, the results of the use of a relatively low fraction of carbon fiber can be further improved when also a relatively low fraction of a lubricating compound is added, resulting in an anti-static composition which comprises 0.1–10% by weight of a lubricating compound as an additive compound (c). Such a lubricating compound substantially increases the processability of otherwise difficult to combine compounds, to wit POM and carbon fiber, even for relatively small amounts of carbon fiber such as in compositions according to the present invention.

The lubricating compound may comprise any one of a wide variety of compounds known to have lubricating properties such as hydroxyl-containing polyolefins, in particular polyethyleneglycol. Preferably the lubricating compound comprises an organic fluoro-containing polymer, in particular a homo- or co-polymer of a fluoro-substituted olefin. A particularly preferred lubricating compound for the present purpose is polytetrafluoroethylene.

Stearate compounds such as calcium stearate and zinc stearate are preferably not used as lubricants in the compositions of this invention, as they have been found to degrade the POM component.

The amount of lubricating compound in the present anti-static composition should be sufficient to increase the compatibility of the other compounds in the composition and attain optimal dispersion of the compounds, in this case 0.1% by weight, although in some compositions a higher minimum amount is preferred, such as 1% by weight, in particular when the amount of carbon fiber is relatively high. On the other hand, the amount of lubricating compound should not exceed a value at which some aspects of processability of the resulting composition become unfavorable, such as deposit formation in moulds or physical properties of the composition; an upper limit of 10% by weight is therefore envisaged, except in case where the presence of other additive compounds require the presence of even higher amounts of lubricating compounds. Preferably, the amount of lubricating compounds is not more than 5% by weight, in order to avoid mould depositions and decreases in thermal- and/or mechanical properties of the anti-static compositions, while retaining excellent processability and dispersion of the various compounds.

The polyoxymethylene polymer component used herein includes homopolymers of formaldehyde or of cyclic oligomers of formaldehyde, the terminal groups of which are end-capped by esterification or etherification, copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification, or a mixture of such homopolymers and copolymers. End-capping is generally done to prevent the polyoxymethylene from "unzipping" as it tends to do at elevated temperatures. Polyoxymethylene copolymers contain at least one comonomer. Comonomers commonly used in preparing polyoxymethylene copolymers include alkylene oxides of 2–12 carbon atoms and their cyclic addition products with formaldehyde. The quantity of comonomer is generally not more than about 20 weight percent, preferably not more than about 15 weight percent, and most preferably about 2 weight percent. The most preferred comonomer is ethylene oxide. The preferred polyoxymethylene homopolymers include those whose terminal hydroxyl groups have been end-capped by a chemical reaction to form ester or ether groups, preferably acetate or methoxy groups, respectively.

The polyoxymethylene used in the compositions described herein may be branched or linear. It generally has a number of average molecular weight in the range of about 10,000 to 100,000, preferably about 20,000 to 75,000. These polyoxymethylene molecular weights are generally preferred in order to provide an optimum balance of good mixing of the various ingredients to be melt blended into the composition with the most desired combination of physical properties in the molded articles made from the such compositions; however, polyoxymethylene polymers having higher or lower molecular weight averages may be used, depending on the physical and processing properties desired. The molecular weight of the polyacetal may conveniently be measured by gel permeation chromatography in m-cresol at 160° C. using a DuPont PSM bimodal column kit with nominal pore size of 60 and 1,000 angstroms.

Polyoxymethylene (POM) homopolymers refers to a known class of compounds including homopolymers of formaldehyde, the terminal groups of which are end-capped by esterification. The POM homopolymer is linear and preferably has a number average molecular weight in the range of 10,000 to 80,000. The molecular weight of the POM can be conveniently measured by gel permeation chromatography in hexafluorisopropanol at about 30° C. using a DuPont PSM bimodal column kit with nominal pore size of 60 to 1000 A.

If the molecular weight of the POM homopolymer is either too high or too low, it is difficult to work with and to disperse within it the carbon fibers and additives, as will be understood by the skilled artisan. Especially suitable POMs are sold under the name DELRIN® acetal resin, manufactured by E. I. du Pont de Nemours and Company of Wilmington, Del., and described in brochure No. H-51416 entitled "DELRIN® Product Guide and Properties" available from DuPont.

The amount of carbon fiber in the anti-static composition according to the invention should not be substantially below 1% by weight because the resulting composition would not have a sufficiently low volume resistivity. The volume resistivity (determined in accordance with British Standard BS 2782: Part 2: Method 230 A: 1982) of the present compositions should preferably be from 10 to $10^8$ Ohm•m (which corresponds with a range from $10^3$ to $10^{10}$ Ohm•cm), and in particular from $10^2$ to $10^7$ Ohm•m. If the volume resistivity is substantially above $10^8$ Ohm•m, then the composition does not show sufficient anti-static properties anymore and becomes an insulator, whereas if the volume resistivity is substantially below 10, the composition becomes an electrical conductor, which is not the purpose of the compositions according to the present invention.

Another reason why the amount of carbon fiber should not be substantially below 1% by weight is the following: during the process of moulding or extruding the composition into a desired shape, fragments of the composition remain which can either be discarded or reused. If they are reused, the fragments are normally ground into smaller pieces prior to their remoulding or reextruding. Grinding of the pieces tends to lower their conductivity.

An amount of substantially more than 10% by weight of carbon fiber in the composition results in entirely different electrical-, mechanical and processing properties from those envisaged i.e. the composition becomes electrically conductive, is difficult to use in moulding- and extrusion processes and shows unattractive elongation (too long) and elastic modulus (too high) properties.

It is also possible to use polyoxymethylene copolymers by copolymerizing formaldehyde and other copolymerizable aldehydes, provided that the number average molecular weight of the resulting copolymers is substantially similar to that of the POM homopolymer described hereinbefore.

Suitable carbon fibers for the composition according to the invention have a cut length from 0.1 mm to 20 mm, and preferably from 1–10 mm. The filament diameter is suitably from 1–20 μm and preferably from 3–10 μm.

If the cut length of the carbon fibers is too long (substantially above 20 mm) then the resulting composition will in many cases become difficult to process by means of extrusion or moulding; when the cut length is too short (substantially below 0.1 mm), then the effect on the electroconductivity and/or mechanical strength of the resulting composition will be insufficient for the present purpose. A similar reasoning applies to the desired diameter of the carbon fiber.

In many embodiments of the present invention it is preferred that the anti-static composition is substantially phosphor-free, although phosphor contents of up to 20 parts per million by weight (ppmw) can be tolerated without a material adverse effect on the resulting properties of the composition. Larger amounts of phosphor should in particular be avoided when a POM having terminal groups which are end-capped by esterification is used, because phosphor compounds have a negative effect on the thermal stability of compositions comprising such POM.

In order to improve the toughness of the compositions according to the invention, additive compound (c) may comprise some elastomer, preferably a polyurethane elastomer and in particular 1–10% by weight thereof. When substantially more than 10% by weight of elastomer is present in the composition, some mechanical properties thereof such as elongation and stiffness are negatively affected for some applications. However, if substantially less than 1% by weight of elastomer is used, the effect on the toughness is negligible.

Heat stabilizing agents, as their name implies, serve to stabilize the compositions of this invention at elevated temperatures, e.g. moulding temperatures, extruding temperatures and the like. Preferably such agents are polyacrylamides and ethylene vinyl alcohol (EVOH). A preferred polyacrylamide will have a small particle size and be non-melting, such as those stabilizers disclosed in U.S. Pat. No. 5,011,890, and is preferably present in the composition of this invention in a weight range of 0.05 to 1.0% by weight, more preferably 0.20 to 0.50% by weight.

Anti-oxidants serve to prevent oxidative degradation in polymers. Suitable anti-oxidants are sterically hindered phenols and include tetrakis[methylene(3,5-di-tert-butyl-4- hydroxy-hydrocinnamate)]methane (supplied by Ciba-Geigy as IRGANOX 1010) and triethyleneglycol bis[3-(3'-tert-butyl-4'-hydroxy-5'-methylphenyl)propionate] (supplied by Ciba-Geigy as IRGANOX 245). The antioxidant is preferably present in the composition in an amount ranging from 0.05 to 0.20% by weight.

Suitably, the presently claimed compositions comprise coloring agents which may be present e.g. in a low density polyethylene matrix. The coloring agent, including carbon black is preferably present in the composition in relatively small amounts ranging from 0.1 to 1.0% by weight.

The invention further relates to moulded articles comprising an anti-static composition as described hereinbefore and to electronic- and mechanical components comprising such a moulded article.

A wide range of applications can be envisaged for the present anti-static compositions, including its use in conveyor belt systems and parts thereof, automotive applications such as fuel systems and parts thereof, in particular fuel filler top end assemblies (including fuel filler-necks and -pockets) and gears and other parts for audio- and video equipment.

The invention is further illustrated by the following Examples.

EXAMPLES

| Example No. | Carbon Fiber (% by wt.) | Volume Resistivity (Ohm · m) | Elastic Modulus (GPa). | Elongation at Break (%) |
|---|---|---|---|---|
| 1 | 0 | $1.6 \times 10^{13}$ | 2.95 | 37.90 |
| 2 | 5 | $1.5 \times 10^{3}$ | 5.35 | 11.70 |
| 3 | 10 | <35 | 8.10 | 5.60 |
| 4 | 18 | <5 | 10.75 | 0.60 |

A two-step process is applied to prepare the compositions tested in Example Nos. 2 and 3 (according to the present invention), wherein the first step comprises the preparation of a concentrate composition comprising 82% by weight of a polyoxymethylene homopolymer, the terminal groups of which are end-capped by esterification, and having a number average molecular weight of about 60,000 and 18% by weight of carbon fibers having an average length of about 6 mm and an average diameter of 7 μm using a single screw extrusion process. In the second step the concentrate composition obtained in the first step is compounded in a single screw extrusion process with a similar polyoxymethylene as described hereinabove which does not contain carbon fiber.

The composition tested in Example 1 (comparative Example, not according to the present invention) comprises a similar POM without carbon fiber as used in step 2 of the process for the preparation of the compositions for Examples 2 and 3 (according to the invention).

The composition tested in Example 4 (comparative Example, not according to the present invention) comprises a similar POM as prepared in step 2 of the aforementioned process.

The Volume Resistivity is measured in accordance with British Standard BS 2782: Part 2: Method 230 A: 1982.

The Elasticity Modulus, expressed in Giga Pascal (GPa) is measured in accordance with standard ISO 527.

The Elongation at Break, expressed as a percentage, is measured in accordance with standard ISO 527.

I claim:

1. An anti-static composition consisting of:

(a) 65–99% by weight of a polyoxymethylene polymer;

(b) 0.5–10% by weight of carbon fiber, and (c) 0.1–10% by weight of a lubricating compound as an additive compound, said lubricating compound is selected from a group consisting of: i) hydroxyl-containing polyolefins; and ii) fluoro-containing polymers;

wherein the composition has a volume resistivity of about 5 to $10^8$ Ohm•m as determined in accordance with British Standard BS 2782:Part 2:Method 230 A:1982.

2. Composition according to claim 1 wherein the lubricating compound comprises an organic fluoro-containing polymer.

3. Composition according to claim 2 which is substantially phosphor-free.

4. Composition according to claim 3 which comprises carbon fibers having a length from 0.1 mm to 20 mm.

5. Composition according to claims 1 or 4 wherein additive compound (c) comprises 1–10% by weight of a polyurethane elastomer.

6. Anti-static composition according to claim 5 wherein the composition has a volume resistivity of about $10^3$ to $10^7$ Ohm•m determined in accordance with Bristish Standard BS 2782:Part 2:Method 230 A:1982.

7. Process for preparing an anti-static composition according to claims 1, 4, or 6 comprising the following steps:

(a) preparing a concentrate composition comprising (i) 55–88% by weight of a polyoxymethylene polymer (ii) 12–25% by weight of carbon fiber, and optionally, (iii) 0.1–20% by weight of a lubricating compound as an additive compound, said lubricating compound is selected from a group consisting of: i) hydroxyl-containing polyolefins; and ii) fluoro-containing polymers, and (b) combining the concentrate composition obtained in step (a) with a polyoxymethylene polymer-containing compound, wherein the anti-static composition has a volume resistivity of 5 to $10^8$ Ohm•m determined in accordance with Bristish Standard BS 2782:Part 2:Method 230 A: 1982.

8. Moulded article comprising an anti-static composition according to any of claims 1, 2–6.

9. Composition of claim 1, further comprising 1–10% thermoplastic polyurethane.

10. Process of claim 8, wherein said concentrate composition further comprises 1–10% thermoplastic polyurethane.

11. Molded article comprising an anti-static composition according to claim 9.

12. Molded article comprising an anti-static composition prepared by the process of claim 8.

13. Molded article comprising an anti-static composition prepared by the process of claim 10.

14. Composition of claim 1, wherein said composition has an elastic modulus of about less than 10 GPa.

15. Molded article comprising an anti-static composition according to claim 14.

* * * * *